(12) United States Patent
Isambart et al.

(10) Patent No.: US 7,843,850 B2
(45) Date of Patent: Nov. 30, 2010

(54) VIDEO QUALITY ASSESSMENT

(75) Inventors: Marc Isambart, Ipswich (GB); Simon Broom, Ipswich (GB)

(73) Assignee: Psytechnics Limited, Ipswich (GB)

( * ) Notice: Subject to any disclaimer, the term of this patent is extended or adjusted under 35 U.S.C. 154(b) by 38 days.

(21) Appl. No.: 12/126,438

(22) Filed: May 23, 2008

(65) Prior Publication Data

US 2008/0291842 A1    Nov. 27, 2008

(30) Foreign Application Priority Data

May 25, 2007    (EP)    ................................. 07109010

(51) Int. Cl.
    *G01R 31/08*    (2006.01)
(52) U.S. Cl. .................................................. 370/252
(58) Field of Classification Search ................. 370/252, 370/468
    See application file for complete search history.

(56) References Cited

U.S. PATENT DOCUMENTS

| | | | | |
|---|---|---|---|---|
| 4,748,620 | A * | 5/1988 | Adelmann et al. | 370/394 |
| 6,490,705 | B1 * | 12/2002 | Boyce | 714/776 |
| 2003/0121053 | A1 | 6/2003 | Honda | |
| 2006/0039475 | A1 * | 2/2006 | Liu et al. | 375/240.16 |
| 2006/0093315 | A1 * | 5/2006 | Kelly et al. | 386/52 |
| 2006/0181536 | A1 * | 8/2006 | Ostermann et al. | 345/473 |
| 2006/0182039 | A1 * | 8/2006 | Jourdain et al. | 370/252 |
| 2006/0221825 | A1 * | 10/2006 | Okano | 370/229 |
| 2007/0047640 | A1 * | 3/2007 | Venna et al. | 375/240.01 |
| 2007/0140134 | A1 * | 6/2007 | Clark | 370/244 |
| 2007/0258383 | A1 * | 11/2007 | Wada | 370/252 |
| 2008/0144519 | A1 * | 6/2008 | Cooppan | 370/252 |
| 2008/0183885 | A1 * | 7/2008 | Durrey et al. | 709/231 |
| 2008/0284853 | A1 * | 11/2008 | Juric et al. | 348/192 |

FOREIGN PATENT DOCUMENTS

| | | | |
|---|---|---|---|
| EP | 1 727 375 A1 | 11/2006 | |
| WO | 02/41635 A1 | 5/2002 | |

OTHER PUBLICATIONS

Broom, VoIP Quality Assessment: Taking Account of the Edge-Device, IEEE Transaction on Audio, Speech and Language Processing, vol. 14, No. 6, Nov. 2006.*

* cited by examiner

*Primary Examiner*—Kwang B Yao
*Assistant Examiner*—Jung Liu
(74) *Attorney, Agent, or Firm*—Burr & Brown

(57) ABSTRACT

The present invention relates to the problem of estimating the effect of packet transmission impairments, including packet loss, on the subjective quality of a video transmission where frames of data relating to the same video frame or field are permitted to span more than one packet. The invention provides a method of assessing quality of a video signal comprising a sequence of video frames received via a packet switched network using a parameter which is a weighted sum of two counters where the first counter is incremented in dependence of the total number of packets in frames determined to have been received with one or more lost packets and the second counter is incremented in dependence of the number of packets following the first lost packet in each frame and the lost packet itself.

10 Claims, 4 Drawing Sheets

VIDEO QUALITY ASSESSMENT

BACKGROUND a. Field of the Invention

The present invention relates to the problem of estimating the effect of packet transmission impairments, including packet loss, on the subjective quality of a video transmission where frames of data relating to the same video frame or field are permitted to span more than one packet.

The invention has particular application in a class of multimedia quality prediction models that predict the effect of packet transmission impairments on the perceived quality of a media stream.

In "VoIP Quality Assessment: Taking Account of the Edge-Device", S R Broom, IEEE Trans on Audio, Speech and Language Processing, Vol 14, No. 6, November 2006, pp 1977-1983, Broom describes a model that predicts the effect of packet transmission impairments on the perceived, or subjective, quality of a voice over internet protocol (VoIP) call. The prediction is based on passive analysis of the packet stream carrying the voice data and can be performed at multiple locations in the network and without interference to the traffic. This type of measurement is referred to as passive or non-intrusive because it does not require a special test signal to be injected into the link being monitored and can be used on live traffic. The model is based on a set of parameters that are derived from the packet stream and which are combined to form a prediction of the voice quality. A process called calibration can be used to optimise the parameter combination for a particular VoIP endpoint, or a generic combination can be derived. The calibration process is based on large numbers of simulated calls made through the endpoint being calibrated, and uses an active or intrusive voice quality measurement algorithm such as ITU-T P.862 (PESQ) to measure their quality.

The general architecture described by Broom has been extended to predict the effect of packet transmission impairments on the perceived quality of a video transmission. The calibration process is very similar to the VoIP case, but uses an active or intrusive video quality model rather than P.862. Some of the model parameters are the same as those in the VoIP model, for example mean packet loss and mean packet delay variation titter); others have been developed to specifically address the problem of measuring video quality.

The present invention provides a degradation parameter derived from packet loss measurements that provides good correlation with subjective video quality and therefore has application in video models such as that described above.

When trying to accurately assess video quality degradations due to packet loss, many issues appear, especially in systems where frames of data relating to the same video frame or field are permitted to span more than one packet. Factors that can influence the importance of a lost packet include:

The type of video frame that is subject to packet loss, e.g. intra, predicted, bi-directionally predicted The distance between Intra-frames Position of packet loss in the frame Any packet loss concealment algorithm implemented in the video endpoint The problem is to accurately model the effects of packet loss on perceived video quality and to correctly take into account the factors mentioned above in a simple and generic way that can be applied on any type of packet video transmission.

b. Related Art

In "MPEG video streamed over an IP-based network with packet loss", Neve et al, 4th FTW PHD Symposium, Interactive poster session, paper nr. 29, Gent, Belgium, Dec. 3, 2003, the authors observe that the quality impairments produced by packet loss are more pronounced at high bit-rates. It is suggested that this is due to the fact that as the video coding bit-rate increases, the data from each frame occupies a larger number of packets and is therefore more likely to suffer from a lost packet. However, this document does not propose a method to take the effect of packet loss on video quality into account.

In "Real-Time Monitoring of Video Quality in IP Networks", Tao et al, NOSSDAV'05, June 13-14, Stevenson, Wash., USA, the authors model the effect of packet loss on video quality in dependence of the codec and packetisation. This document suggests two models (one for MPEG-2 Video and one for H.264). Both models take into account the length of the loss burst, the average number of slices (where a "slice" represents part of a video frame) per packet and the average number of packets per frame. However, some of these inputs require access to the video payload, such as the number of slices per packet, and many effects are not taken into account, including frame type, the position of packet loss within a frame and the behaviour of the video endpoint.

In "Modeling Packet-Loss Visibility in MPEG-2 Video", IEEE Transactions on Multimedia. Vol. 8, No. 2, April 2006, Kanumuri et al, the authors describe a model for estimating the visibility of packet loss in MPEG-2 video. Again, most of the factors described that affect the visibility of errors are extracted from the video payload.

A key limitation of the quality prediction methods described in the prior art is that in order to take into account the factors listed in the problem statement they require access to elements of the video packet payload. However, payload encryption is becoming increasingly common in packet transmission systems, for example to protect the copyright of video content or to ensure the privacy of people using a video conferencing system. In such cases, the payload of the video packets cannot be used to make an accurate estimation of the perceived quality degradation due to packet loss.

In contrast to the prior art, the present invention takes some of the factors described previously into account without using the video payload, and exploits the fact that when even when encryption is used, the media transport protocol header (e.g. Real-time Transport Protocol (RTP), Real Data Transport (RDT) protocol or Motion Picture Experts Group—Transport Protocol (MPEG-TS)) is generally kept unencrypted.

SUMMARY OF THE INVENTION

The present invention provides a method according to claim 1. Preferred embodiments are defined in the dependent claims.

The method provides a parameter that estimates the degradation in perceived video quality due to packet loss. The method only requires access to the media transport protocol header in each packet, not the payload itself, and is thus unaffected by most encryption schemes. Furthermore, weighting coefficients used in the calculation of the parameter can be optimised to maximise the prediction accuracy for a particular video endpoint.

The parameter is a weighted sum of two counters where the first counter is incremented in dependence of the total number of packets in frames determined to have been received with one or more lost packets and the second counter is incremented in dependence of the number of packets following the first lost packet in each frame and the lost packet itself.

Modern video codecs do not encode all frames of the input sequence using the same method. Some frames are encoded entirely without reference to any preceding or subsequent frames and the resultant encoded frame is called an intra or I-frame. Other encoded frames may only encode changes relative to an earlier frame, and are called predicted or P-frames. Bi-directionally predicted or B-frames can encode changes relative to combinations of both preceding and subsequent frames.

The first counter enables the size of frames affected by packet loss to be taken into account because it is incremented in proportion to the size of frames that are subject to packet loss. This also indirectly takes the nature of the video frame into account because I slices/frames typically have more packets than P slices/frames and P slices/frames have more packets than B slices/frames.

The second counter enables the position of the lost packets inside a video frame to be taken into account. Some decoders can decode a frame up to the lost packet; hence the closer the first lost packet in a frame is to the start of the frame, the more impact it will have on the quality of the decoded video.

Finally, the weighting coefficients enable the parameter to be optimised to best reflect a particular video endpoint's behaviour. For example, some decoders will try to decode as much as they can when a packet is lost whereas other decoders will discard the whole frame when a packet is lost.

Since a weight of zero may be applied to each of the sub-parameters the scope of the invention includes each of the two sub-parameters in isolation.

BRIEF DESCRIPTION OF THE DRAWINGS

The invention will now be described, by way of example only, with reference to the accompanying drawings, in which.

DETAILED DESCRIPTION

Figure 1:
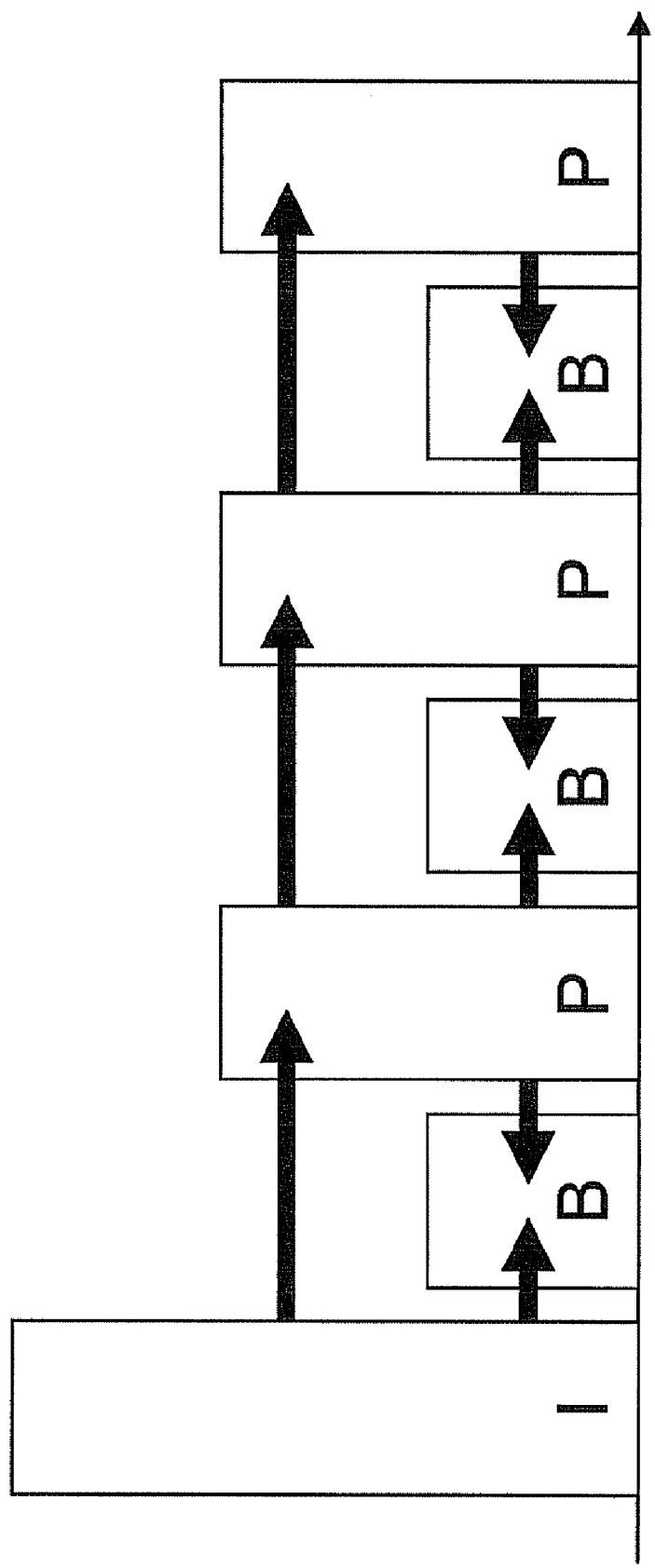
FIG. 1 illustrates typical coding by modern video codecs.

Referring now to FIG. 1, encoding using I-frames B-frames and P-frames is illustrated. The advantage of using P and B-frames is that they only encode the difference between the frame to be encoded and another frame, and can therefore be encoded using fewer bits than the equivalent I-frame. However, P and B-frames suffer from a problem called error-propagation whereby an error in one frame will also affect any frames that are based on it. Most recent video coding standards support I, P and B frames, including MPEG-2 part 2, MPEG-4 part 2, MPEG-4 Part 10 (H.264), H.263 and VC-1, with the more recent standards extending the concept of I, P and B encoding to slices of pictures in addition to whole frames.

The result of such video coding approaches is that successive encoded video frames can vary widely in their size in bytes and their sensitivity to errors. Moreover the bit-rates required to transport video images dictate that each video encoded frame must often be divided into parts and transmitted in multiple packets.

The most common packet transport protocol is the Internet Protocol (IP) and the most common media transport protocols are the Real-time Transport Protocol (RTP), the Motion Picture Experts Group-Transport Protocol (MPEG-TS), and the proprietary Real Data Transport (RDT) protocol. All of the protocols mentioned also include some form of sequence number that is incremented every packet thus enabling lost packets to be detected. The RTP and RDT protocols include a timestamp field in the media transport header in each packet that is set to the same value for all packets belonging to the same video frame, which can therefore be used to determine which packets belong to which video frame. The MPEG-TS protocol includes a marker bit that can be used to identify frame boundaries.

Figure 2:
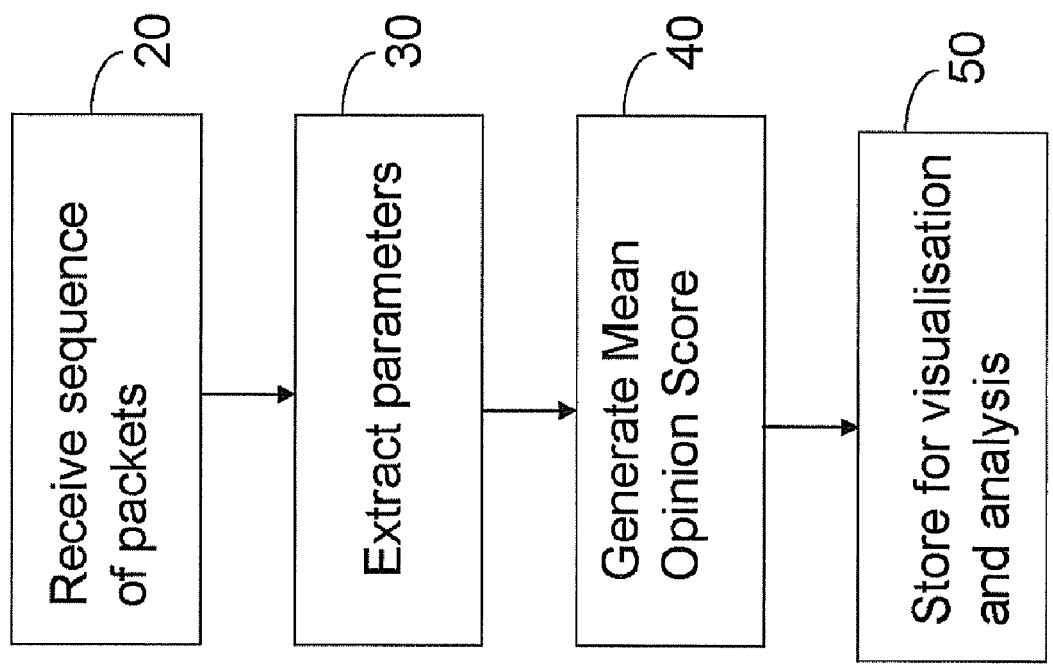
FIG. 2 is a flow chart illustrating an embodiment of the method of the present invention.
Figure 3:
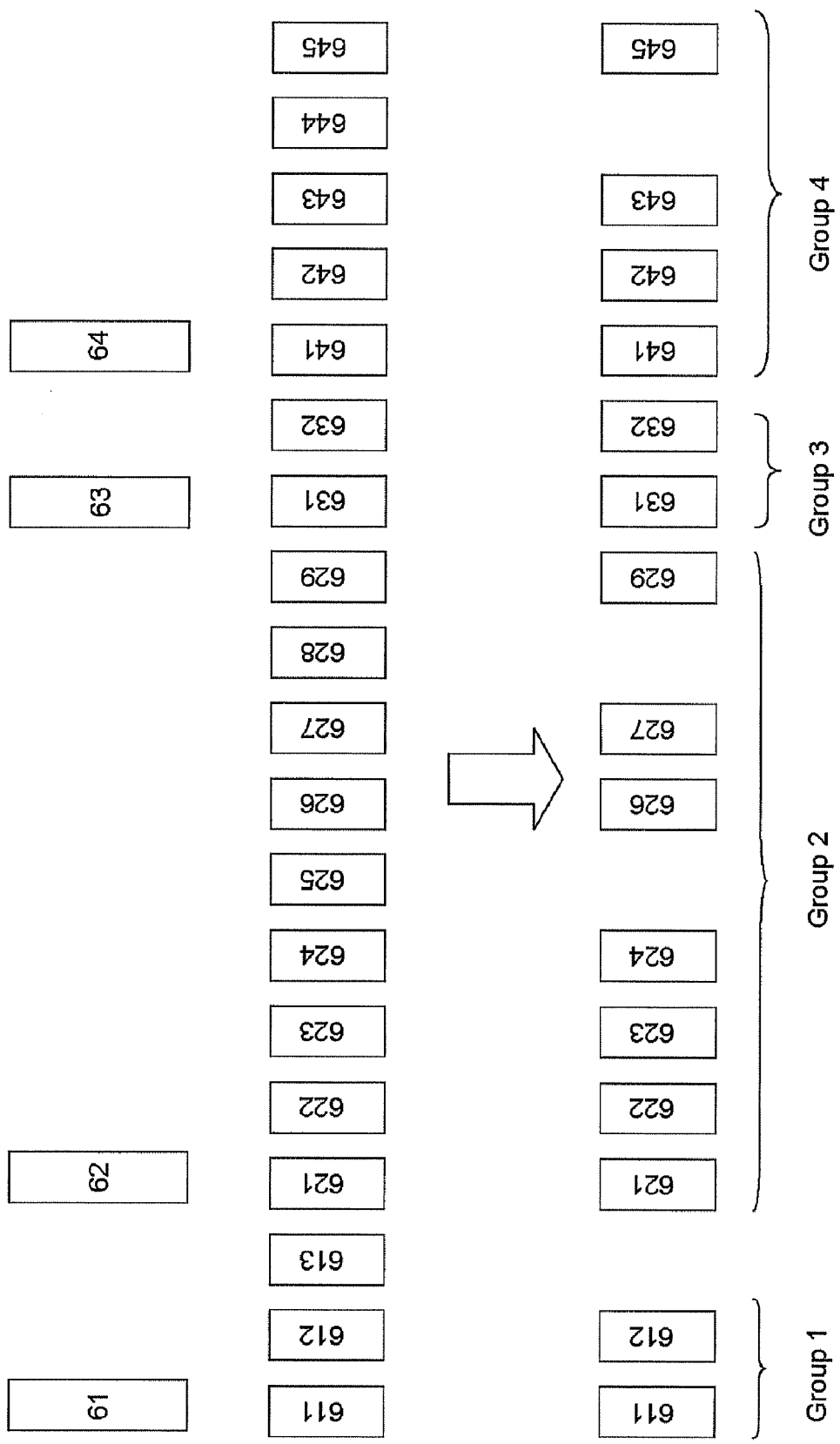
FIG. 3 is an illustration of transmission of video frames using a packet based protocol.
Figure 4:
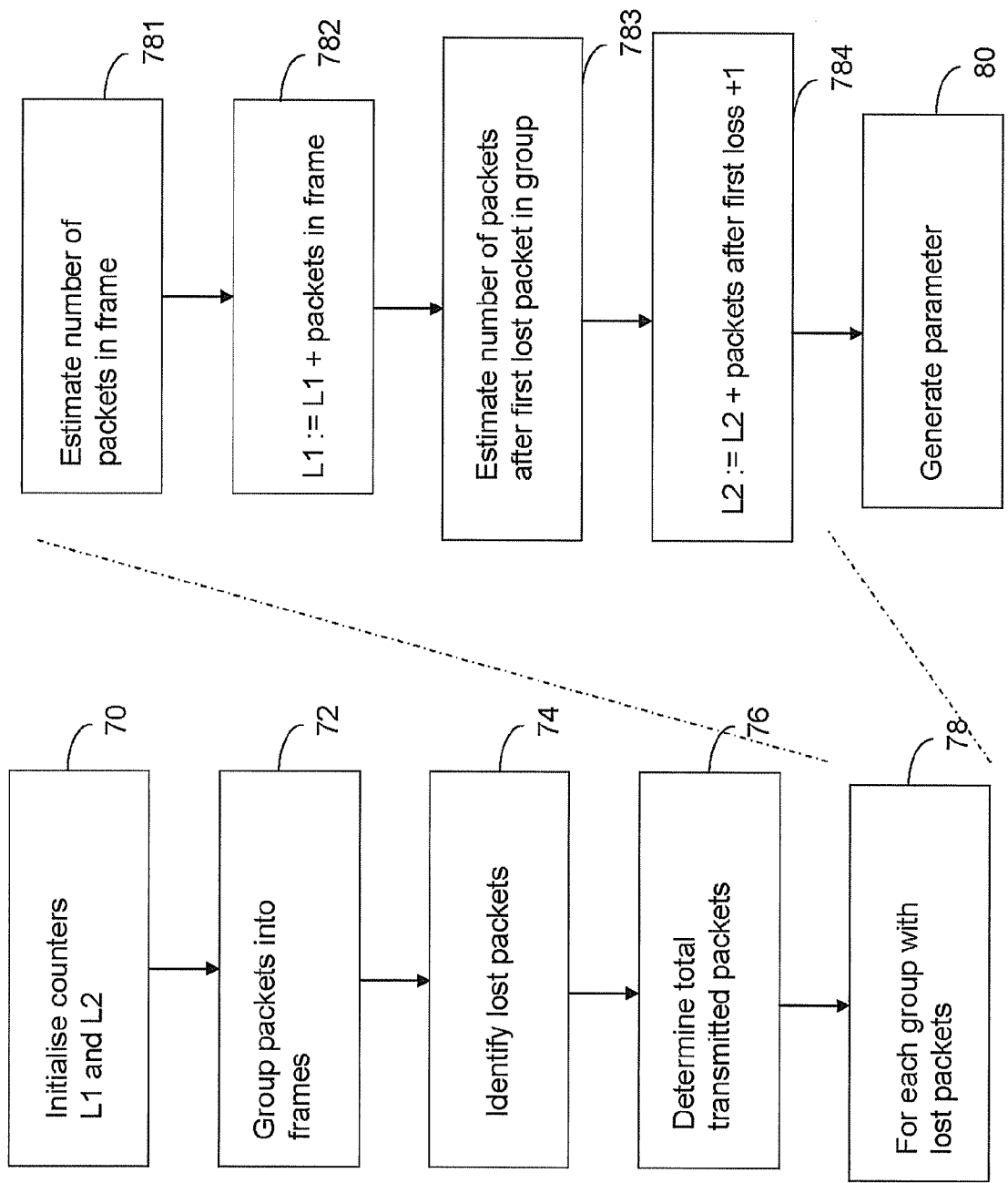
FIG. 4 is a flow chart illustrating extraction of a parameter in accordance with the present invention.

Referring now to FIGS. 2, 3 and 4 a preferred embodiment of the invention is now described.

FIG. 2 illustrates a known method of generating a mean opinion score for use in visualisation and analysis. At step 20 a sequence of packets are received. Said sequence of packets will typically be generated by making copies of the packets in the packet switched network at the point where the video quality is to be evaluated using a monitoring point such as a mirror port on a packet router or switch. The following steps may be performed at the time the packets are received or the sequence of packets may be stored for later analysis.

At step 30 a set of parameters is extracted from the received sequence of packets and these parameters are used to generate a Mean Opinion Score (MOS) at step 40, which are stored on a computer readable medium for visualisation and analysis at step 50.

FIG. 3 illustrates transmission and receipt of packets representing a video signal comprising a sequence of video frames 61..64. For illustrative purposes each video frame 61..64 comprises a different number of packets 611..613; 621..629 etc.

Groups of packets 1,2,3,4 represent received packets, where some packets in the sequence have been lost.

FIG. 4 illustrates extraction of a parameter in accordance with the method of the present invention.

At step 70 counters L1, L2 are initialised to zero. A degradation parameter D is then calculated according to the following steps:

At step 72 the received packets are re-ordered, if necessary, such that all of the packets are in their original, transmitted order. In the preferred embodiment, a sequence number in the media transport protocol headers is used for this purpose. The packets are then grouped into sets of packets corresponding to video frames, i.e. such that any each set contains all of the received packets for a particular video frame. In the preferred embodiment, a timestamp in the media transport protocol headers is used for this purpose. Such groups 1,2,3,4 are shown in FIG. 3.

At step 74 lost packets are identified. In the preferred embodiment, lost packets are identified by discontinuities in a sequence number in the media transport protocol header in the re-ordered packet stream.

At step 76 an estimate of the total number of transmitted packets P is determined by considering the total number of packets received and the total number of packets which have been identified as having been lost Then at step 78 for each group where it is determined that packets are missing the counters L1, L2 are updated as follows:

At sub-step 781 an estimate of the number of packets in the video frame is generated and at sub-step 782 L1 is incremented by the estimated number of packets in the video frame.

At sub-step 783 the number of packets following the first lost packet in the video frame is estimated and at sub-step 784 L2 is increment by the estimated number of packets following the first lost packet in the video frame plus one.

After this process has been iteratively carried out for all groups where it is determined that packets are missing, at step 80 the a degradation parameter D is calculated as the normalised weighted sum of the two counters L1 and L2 according to the equation:

$$D=(W1.L1+W2.L2)/P$$

where W1 and W2 are weighting coefficients chosen that such that W1+W2 =1.

In the preferred embodiment, when determining the number of missing or lost packets in any given video frame, the sequence number of the last packet in the video frame being analysed is compared with the sequence number of the first packet in the following frame; if there is a discontinuity, indicating a lost packet, it is assumed that the missing packet or packets belonged to the earlier of the two video frames.

In the preferred embodiment the values of W1 and W2 are determined using a calibration process similar to that described by Broom. Note that W1 or W2 may be set to zero, if required; in which case it is not necessary to implement the corresponding counter for that particular optimised version of the invention.

In the preferred embodiment the parameter D may be combined with other parameters to produce a quality prediction model of the type described by Broom, and discussed with reference to FIG. 2, using the calibration process to optimise the relative weighting of the various parameters.

Predictions of video quality made according to the invention will pertain to the point in the packet switched network at which the packets were captured. The invention can therefore be used to identify faulty links in the network by making multiple video quality measurements at different points in the network and comparing the measurements to identify any network links that result in a significant drop in the predicted quality.

It will be understood by those skilled in the art that the methods described above may be implemented on a conventional programmable computer, and that a computer program encoding instructions for controlling the programmable computer to perform the above methods may be provided on a computer readable medium.

The invention claimed is:

1. A method of assessing quality of a video signal comprising a sequence of video frames received via a packet switched network, the method comprising the steps of:
   receiving a received sequence of packets via said packet switched network;
   extracting a set of parameters from said received sequence of packets;
   generating an estimated mean opinion score in dependence upon said set of parameters; and
   storing the estimated mean opinion score on a computer-readable medium accessible by a user for visualization and analysis;
   wherein the extracting step comprises the sub steps of:
   setting a first counter to zero;
   setting a second counter to zero;
   grouping packets of said received sequence of packets into groups of packets, each group corresponding to a transmitted video frame;
   determining identified lost packets determining whether each group has received all packets comprising the corresponding transmitted video frame in dependence upon said identified lost packets;
   for each group where it is determined that packets have not been received, performing the sub-steps of:
   determining a frame size estimate of the number of packets in a corresponding transmitted video frame;
   incrementing the first counter in dependence upon said frame size estimate;
   determining a subsequent packet estimate of the number of packets after a first lost packet in said corresponding transmitted video frame;
   incrementing the second counter in dependence upon said subsequent packet estimate; and
   determining a parameter in dependence upon a weighted sum of said first counter and said second counter.

2. A method according to claim 1, in which in the event that a weight applied to the first or second counter is equal to zero, the method is optimised accordingly.

3. A method according to claim 1, further comprising the steps of:
   determining a total number of transmitted packets estimate in dependence upon said received sequence of packets and said identified lost packets; and
   determining said parameter in dependence upon said weighted sum normalised with respect to said total number of transmitted packets estimate.

4. A method according to claim 1, in which a timestamp in a packet header is used to determine which packets correspond to which video frame.

5. A method according to claim 1, in which a marker bit in a packet header is used to determine which packets correspond to which video frame.

6. A method according to claim 1, in which a sequence number in the packet header is used to determine identified lost packets.

7. A method according to claim 1, where the weighted sum is optimised to maximise the accuracy of the perceived quality estimate for a particular video endpoint.

8. A method according to claim 1, in which the relative weighting of said parameter and any additional quality prediction parameters is optimised for a particular video endpoint.

9. A computer readable non-transitory medium carrying a computer program which is executable by a processor and which, when executed by a processor, performs a method as recited in claim 1.

10. A computer program which is stored in a computer readable non-transitory medium and is executable by a processor, and which, when executed by a processor, performs a method as recited in claim 1.

* * * * *

UNITED STATES PATENT AND TRADEMARK OFFICE
CERTIFICATE OF CORRECTION

| | |
|---|---|
| PATENT NO. | : 7,843,850 B2 |
| APPLICATION NO. | : 12/126438 |
| DATED | : November 30, 2010 |
| INVENTOR(S) | : Marc Isambart and Simon Broom |

It is certified that error appears in the above-identified patent and that said Letters Patent is hereby corrected as shown below:

Column 6
    *Line* 7: please make a new paragraph after "lost packets" and beginning with "determining whether"

Signed and Sealed this
First Day of February, 2011

David J. Kappos
*Director of the United States Patent and Trademark Office*